June 21, 1949.　　　S. LE R. BRADLEY　　　2,473,854
REGULATING SYSTEM
Filed Nov. 20, 1947

WITNESSES:

INVENTOR
Schuyler LeRoy Bradley.
BY
James N. Ely
ATTORNEY

UNITED STATES PATENT OFFICE 2,473,854

REGULATING SYSTEM

Schuyler Le Roy Bradley, Pittsburgh, Pa., assignor to Westinghouse Electric Corporation, East Pittsburgh, Pa., a corporation of Pennsylvania Application November 20, 1947, Serial No. 787,123

2 Claims. (Cl. 322—24)

This invention relates to regulating systems for dynamo-electric machines, and in particular, to systems for maintaining minimum excitation of such machines.

An object of this invention is to provide a static system responsive to the excitation of a dynamo-electric machine for maintaining the excitation of the dynamo-electric machine above a predetermined value.

Another object of this invention is to provide a regulating system having a simple and sensitive static electrical circuit for insuring minimum excitation of the machine being regulated.

Figure 1:
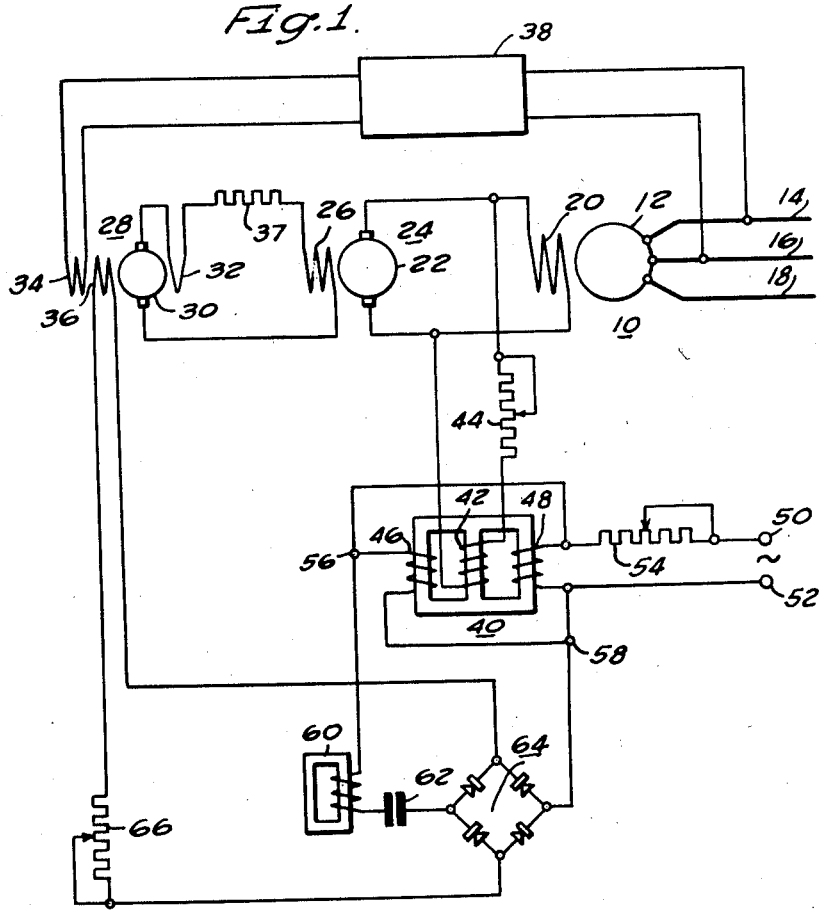
Figure 2:
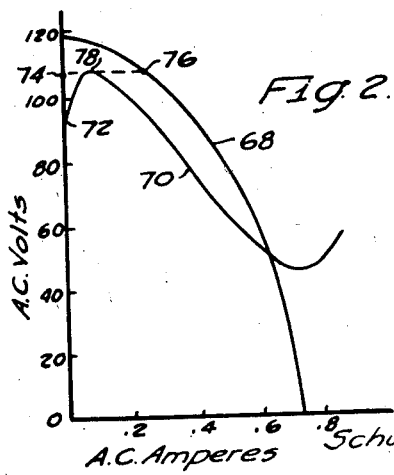

Other objects of this invention will become apparent from the following description when taken in conjunction with the accompanying drawing, in which:

Figure 1 is a diagrammatic representation of a regulating system embodying the teachings of this invention, and Fig. 2 is a graph the curves of which represent the impedance characteristics of certain parts of the system shown in Fig. 1.

Referring to Fig. 1 of the drawing, this invention is illustrated with reference to a regulating system for a dynamo-electric machine 10 such as a generator. The dynamo-electric machine 10 comprises the armature windings 12 connected to load conductors 14, 16 and 18, and a field winding 20 connected across the armature windings 22 of an exciter 24. The exciter 24 is provided with field windings 26 which are connected to be energized in response to the operation of a regulating exciter 28.

The regulating exciter 28 is of the self-energizing or "series tuned" type which normally operates along the linear part of its saturation curve. The regulating exciter 28 is provided with armature windings 30, a self-energizing field winding 32 and two control field windings 34 and 36. As illustrated, the field winding 26 of the exciter 24 is connected through a resistor 37 and the self-energizing field winding 32 to one side of the armature windings 30 of the regulating exciter 28, the other terminal of the field winding 26 being connected to the other side of the armature windings 30. The series field winding 32 is employed for normally supplying the excitation requirements of the exciter 28.

The control field winding 34 is disposed to be directionally energized to either aid or oppose the excitation effect of the self-energizing series field winding 32 in response to voltage changes on conductors 14, 16 and 18. Thus, the control field winding 34 is connected through a voltage regulator 38 across the conductors 14 and 16. Any suitable voltage regulator 38 may be employed, it being preferred, however, to employ the regulator having a voltage reference network as disclosed and claimed in Patent No. 2,428,566, issued October 7, 1947 in the name of E. L. Harder, et al., and assigned to the assignee of this invention.

In accordance with this invention, the control field winding 36 is disposed to be energized in one direction only, in response to a predetermined degree of excitation of the generator 10. In order to obtain such results, a three-legged saturable core reactor 40 is employed for aiding in the control of the energization of the field winding 36. The saturable core reactor 40 is provided with a direct current control winding 42 which is disposed to be connected across the armature windings 22 of the exciter 24, a resistor 44 being provided in the direct current control winding circuit for adjusting the degree of energization thereof. Thus, the winding 42 is energized in accordance with the excitation of the generator 10, as determined by the output of the exciter 24.

The saturable core reactor 40 is also provided with a pair of alternating current windings 46 and 48 disposed on the outer legs thereof and connected in parallel circuit relation with one another to be supplied from a source of alternating current represented by the terminals 50 and 52, an adjustable resistor 54 being connected in the supply circuit for the alternating current windings 46 and 48, the purpose of which will be explained more fully hereinafter.

As illustrated, a saturating reactor circuit is connected across the output terminals 56 and 58 of the saturable reactor 40 for controlling the current flow in the control field winding 36 of the regulating exciter 28. This circuit comprises a saturating reactor 60, a capacitor 62 and a dry-type full wave rectifier 64 connected in series circuit with one another and across the terminals 56 and 58, whereby the current flow in such circuit is controlled by the voltage appearing across the terminals 56 and 58. The control field winding 36 is connected across the output terminals of the dry-type rectifier 64, an adjustable resistor 66 being connected in such output circuit for adjusting the degree of energization of the winding 36, where desired. The saturating reactor series circuit just described has an impedance characteristic curve as represented by curve 70 of Fig. 2 and which will be referred to hereinafter, such that for changes in voltage up to a predetermined value across the terminals 56 and 58 current does not flow in such circuit, whereas, for voltage increases across the terminals 56 and 58 above such predetermined value, the current flow in the series circuit increases quite rapidly.

In operation, assuming that the system is as shown and that the generator 10 is being operated to supply a given load, the excitation of the generator 10 is at a normal value with the regulating exciter 28 being operated to maintain such normal excitation. If for any reason the operating condition should change so that there is a decrease in the voltage across the load conductors 14 and 16, then the voltage regulator 38 operates in a well-known manner to effect the energization of the control field winding 34 in a direction to aid the excitation effect of the self-energizing field winding 32 of the regulating generator 28, and thereby increase its output with the result that the excitation of the exciter 24 is increased. Under such conditions, the increase in current flow through the field winding 20 of the generator 10 effectively increases the excitation of the generator 10 to increase the voltage across conductors 14 and 16 to a predetermined value which is to be maintained.

If, on the other hand, the voltage change across load conductors 14 and 16 is an increase, then the voltage regulator 38 functions to energize the control field winding 34 in a direction to tend to oppose the excitation effect of the self-energizing field winding 32 to decrease the output of the regulating exciter 28, and thereby decrease the excitation of the exciter 24. Under such conditions, the current flow through the field winding 20 of the generator 10 is operated to return the voltage across the conductors 14 and 16 to the predetermined value which is to be maintained.

In the foregoing operation described with respect to the control of the control field winding 34, the effect of the control field winding 36 has been ignored. If during the normal operation of the system, the output of the exciter 24 increases with the result that the excitation of the generator 10 increases, the direct current flow in the control field winding 42 of the saturable reactor 40 is increased, with the result that the saturation of the three-legged reactor 40 is increased. As the impedance of the parallel connected alternating current windings 46 and 48 is thus decreased, the current flowing in such windings increases. As the current flow to the alternating current windings 46 and 48 increases, the current through the adjustable resistor 54 effects a larger potential drop thereacross with the result that the potential across the output terminals 56 and 58 of the reactor is greatly decreased. This is evident for the voltage across the output terminals 56 and 58 is equal to the voltage input to the alternating current winding circuit across the terminals 50 and 52 minus the potential drop across the adjustable resistor 54. Under such conditions, the voltage appearing across the output terminals 56 and 58 of the saturable core reactor 40 is insufficient to effect more than a minor if any flow of current in the saturating reactor series circuit, with the result that very little, if any, current flows in the control field winding 36.

If, on the other hand, however, the output of the exciter 24 and consequently the excitation of the generator 10 decreases, then the current flow in the direct current control winding 42 of the saturable core reactor 40 is decreased with the result that the impedance of the alternating current windings 46 and 48 is increased, and the current flow therethrough is decreased. As the current drawn by the alternating current windings 46 and 48 decreases, the potential drop across the adjustable resistor 54 decreases substantially proportional to the magnitude of the current therethrough, with the result that the voltage appearing across the output terminals 56 and 58 of the reactor 40 increases. When this voltage increases to a value above a predetermined value, depending upon the impedance of the saturating reactor circuit, further increases of voltage effects a large increase in the current flow in the saturating reactor circuit, with the result that the current flow through the saturating reactor circuit effects a large increase in the current flowing through the control field winding 36.

Under such conditions, if the voltage regulator 38 is operating to energize the control field winding 34 in a direction to oppose the excitation effect of the self-energizing field winding 32 to force the excitation of the exciter 24 downwardly, then the current flow through the control field winding 36 from the saturation core reactor circuit opposes the regulating effect of the control field winding 34 to tend to aid the excitation effect of the self-energizing field winding 32 to increase the excitation of the exciter 24 to maintain the output thereof at a value above a predetermined value to maintain a predetermined minimum excitation of the generator 10.

As will be apparent when the current flow in the control field winding 36 is of sufficient magnitude to counterbalance the excitation effect in the one direction of the control field winding 34, then the control of the regulating exciter 28 is no longer dependent upon the operation of the voltage regulator 38, but is dependent upon the functioning of the static circuit, including the saturable core reactor 40 and the saturating reactor circuit connected thereacross. The saturating reactor circuit and the adjustable resistor 54 of the static circuit cooperate to give a very sensitive control of the energization of the control field winding 36 in response to variations in the output of the exciter 24, and consequently, the excitation of the generator 10.

While reference has been made hereinbefore with respect to the sensitivity of the minimum excitation system for controlling the excitation of control field winding 36, this sensitivity and the operation of the circuit will become more apparent by reference to Fig. 2 of the drawing. In Fig. 2, curve 68 is a representation of the voltage output across the terminals 56 and 58 of the saturable core reactor 40 as the alternating current input to the alternating current winding circuit varies and curve 70 is a representation of the impedance characteristics of the saturating reactor circuit composed of the series connected saturating reactor 60, capacitor 62 and full-wave rectifier 64. The shape of the curve 70 of course can be varied somewhat depending upon the choice of the capacitor 62 and the saturating reactor 60.

As explained hereinbefore, the voltage across the output terminals 56 and 58 of the saturable reactor 40 for any given energization of the direct current control winding 42 is dependent upon the voltage input to the energizing circuit of the parallel connected alternating-current windings 46 and 48 of the reactor 40 and the potential drop across the adjustable resistor 54.

Thus as the potential drop across resistor 54 increases, the voltage appearing across the output terminals 56 and 58 decreases.

Referring to the curves 68 and 70 of Fig. 2, it is apparent that as the voltage appearing across the output terminals 56 and 58 initially increases to a predetermined value represented by the point 72, there is no current flowing in the saturating reactor circuit connected across the output terminals 56 and 58. At this point, current of small value begins to flow in the saturating reactor circuit and as the voltage across the output terminals 56 and 58 of the saturable reactor 40 increases, the current flow in the saturating reactor circuit increases until the voltage across terminals 56 and 58 increases to the point 74 indicated on Fig. 2. It is thus seen that the current flow in the saturating reactor circuit at first increases in small increments until the voltage indicated as at 74 appears across the output terminals at which point the total current flow to the alternating-current windings 46 and 48 and to the saturating reactor circuit is represented by the line between points 74 and 76 appearing on the drawing. Thus the current in the alternating-current windings is represented by the line between points 78 and 76 and the current in the saturating reactor circuit is represented by the line between points 74 and 78.

Now if the current flow in the alternating-current windings 46 and 48 is decreased by reason of a decrease in the current flow in the direct-current control winding 42, such a decrease in the current flow in the alternating current windings 46 and 48 tends to decrease the potential drop across the adjustable resistor 54 with the result that the voltage appearing across the output terminals 56 and 58 tends to increase. When the voltage across the terminals 56 and 58 tends to increase, the current flow in the saturating reactor circuit is increased. This results in a total current through the adjustable resistor 54 larger than that represented by the line between points 74 and 76. Therefore, the potential drop across the adjustable resistor 54 increases, thus decreasing the voltage appearing across the output terminals 56 and 58.

As the current in the alternating current windings 46 and 48 continues to decrease as a result of decreasing the direct current in the control winding 42, the voltage across the output terminals 56 and 58 continues to attempt to rise but as a result of this tendency to rise, larger measure of current flows through the saturating reactor circuit causing the total current that flows through the adjustable resistor 54 to increase. As a result of this increased current in resistor 54, the voltage across terminals 56 and 58 decreases and follows along the characteristic curves 68 and 70. As the voltage follows along the characteristic curves 68 and 70, the current appearing between corresponding voltage points on the curves 70 and 68 is decreased slightly representing the decrease in current drawn by the alternating current windings 46 and 48, whereas the current appearing between corresponding points on the voltage ordinate and the curve 70 greatly increases representing the current flow in the saturating reactor circuit and consequently in the control field winding 36. It is thus apparent that for slight changes in voltage across the exciter 24 a very sensitive control of the minimum excitation circuit is obtained giving a large increase in current flow in the control field winding 36 for very slight changes in voltage across the exciter 24 after the predetermined voltage output of the reactor 40, as represented by the point 72 referred to hereinbefore is reached.

The system of this invention is very sensitive in operation, being effective to maintain regulation of generator 10 and to insure that the excitation thereof will not decrease below a predetermined minimum value. As the minimum excitation circuit is formed of static components, it is apparent that the system will be quite stable during operation, gives a fast response and requires little maintenance. The system is formed of standard components and can be readily duplicated by one skilled in the art.

I claim as my invention:

1. In a regulating system for a dynamo-electric machine disposed to supply a load circuit, in combination, an exciter for controlling the field excitation of the dynamo-electric machine, a main control field winding for the exciter disposed to be directionally energized to control the excitation of the exciter, means responsive to a change in condition of the load circuit supplied by the dynamo-electric machine disposed for operation to control the directional energization of the main control field winding, an auxiliary control field winding disposed to be energized in one direction only in opposition to a predetermined directional energization of the main control field winding, and means for controlling the energization of the auxiliary control field winding, said means including a saturable core reactor having a direct-current control winding disposed to be energized in accordance with the excitation of the dynamo-electric machine, alternating current windings for the reactor connected to be supplied from a source of alternating current, a circuit including a saturating reactor and a dry-type rectifier connected to be supplied from the saturable reactor, and means connected in the supply circuit for the alternating-current windings of the saturable reactor disposed to provide a potential drop proportional to the current flowing in the alternating-current windings to control the voltage across and the current flow in the circuit including the saturating reactor, the auxiliary control field winding being connected to be supplied by the rectifier.

2. In a regulating system for a dynamo-electric machine disposed to supply a load circuit, in combination, an exciter for controlling the field excitation of the dynamo-electric machine, a main control field winding for the exciter disposed to be directionally energized to control the excitation of the exciter, means responsive to a change in condition of the load circuit supplied by the dynamo-electric machine disposed for operation to control the directional energization of the main control field winding, an auxiliary control field winding disposed to be energized in one direction only in opposition to a predetermined directional energization of the main control field winding, and means for controlling the energization of the auxiliary control field winding, said means including a saturable core reactor having a direct-current control winding disposed to be energized in accordance with the excitation of the dynamo-electric machine, alternating current windings for the reactor connected to be supplied from a source of alternating current, a series circuit including a saturating reactor, a capacitor and a dry-type rectifier connected to be supplied from the saturable reactor, and a resistor connected in the supply circuit for the alternating-current windings of the saturable core reactor disposed to provide a potential drop proportional to the current flowing in the alternating current windings to control the voltage across said series circuit to thereby control the current flow in said circuit, the auxiliary control field winding being connected to be supplied by the rectifier.

SCHUYLER LE ROY BRADLEY.

REFERENCES CITED

The following references are of record in the file of this patent:

UNITED STATES PATENTS

| Number | Name | Date |
|---|---|---|
| 1,710,755 | West | Apr. 30, 1929 |
| 2,407,476 | Crever | Sept. 10, 1946 |